W. C. HERRON.
APPARATUS FOR MOLDING SOLID LINK CHAINS.
APPLICATION FILED APR. 4, 1908.
923,521.
Patented June 1, 1909.
2 SHEETS—SHEET 1.
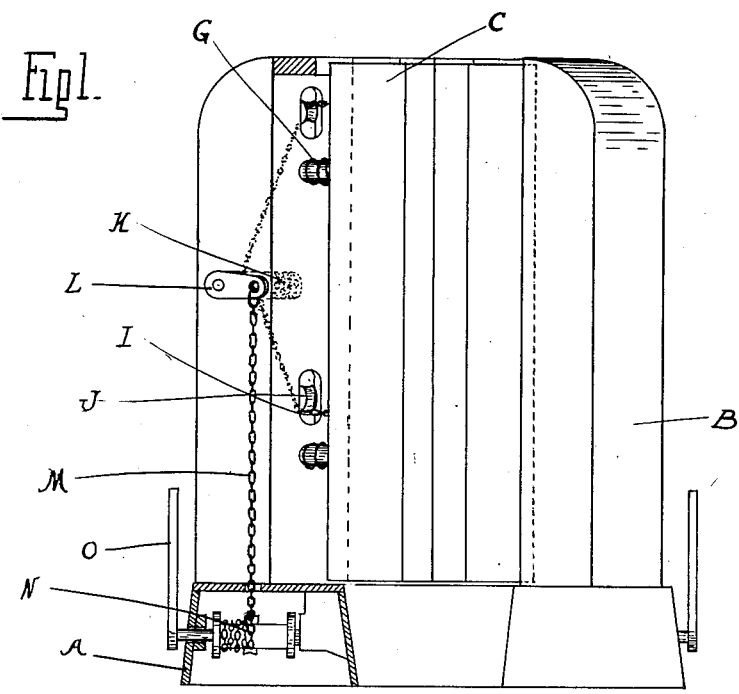
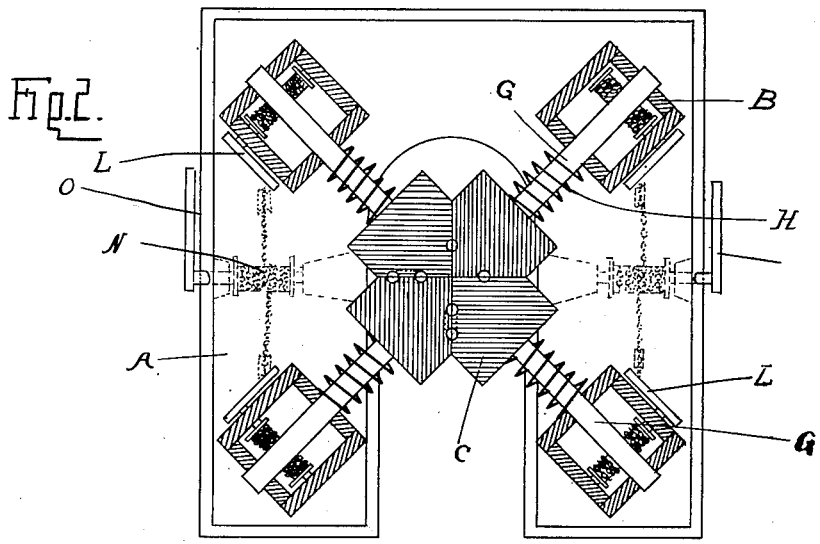
Witnesses
Inventor
William C. Herron
By

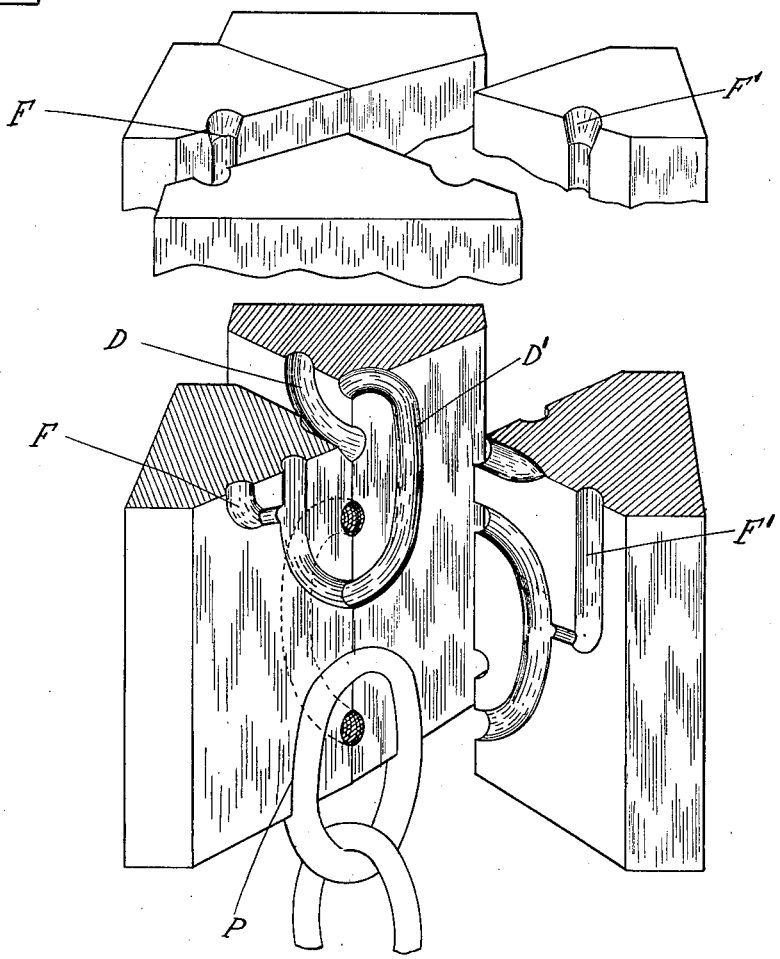

UNITED STATES PATENT OFFICE.

WILLIAM C. HERRON, OF SARNIA, ONTARIO, CANADA, ASSIGNOR OF ONE-FIFTH TO E. A. REEVES, OF SARNIA, CANADA.

APPARATUS FOR MOLDING SOLID-LINK CHAINS.

No. 923,521.   Specification of Letters Patent.   Patented June 1, 1909.

Application filed April 4, 1908. Serial No. 425,206.

*To all whom it may concern:*

Be it known that I, WILLIAM C. HERRON, a subject of the King of Great Britain and Ireland, residing at Sarnia, in the Province of Ontario and Dominion of Canada, have invented certain new and useful Improvements in Apparatus for Molding Solid-Link Chains, of which the following is a specification, reference being had therein to the accompanying drawings.

The invention relates to the manufacture of solid link chains and it is the object of the invention to obtain a process and apparatus by which continuous solid link chains of any desired length may be formed.

To this end the invention consists, first, in a process for casting the chain in sections having interlooped solid links; further, in the method by which each section is united to the chain formed of the previously cast sections; further, in the peculiar construction of the matrices in which the chain section is cast, and, further, in the peculiar construction, arrangement and combination of parts as hereinafter set forth.

In the drawings—Figure 1 is a front elevation of the machine; Fig. 2 is a horizontal section thereof; and Fig. 3 is a sectional perspective view of the matrices in operative relation to each other.

Generally speaking, the apparatus employed for forming the chain consists of a sectional mold having two parting planes at right angles and preferably perpendicular to each other, the mold cavities for alternate links being in the same plane and being interlooped with the link cavities in the other plane. With such a mold the necessary draft is provided to permit the sections to separate from the casting after each operation and upon again closing these sections the mold is in condition for a succeeding operation. Thus the sections of the chain may be successively cast. It is however one of the objects of the invention to obtain a chain of any desired length in which all of the links are solid, and to accomplish this each succeeding section is cast to interloop with the end link of the chain previously formed. This result is obtained by placing said end link in the end cavity of the series in the mold before the closing of the sections thereof. Thus by employing this method section after section may be added to the chain to produce any length desired.

In detail, the apparatus as shown consists of a suitable bed plate A on which are mounted the pillars or frame members B for supporting the separable sections of the mold or matrices C. Each of these matrices has formed therein mold cavity sections D and D' in faces thereof which are at right angles to each other and when all of the matrices are close together a series of interlooped mold cavities is formed. Each individual mold cavity is fed from a sprue also formed in the matrices, there being two sprues F F' for respectively feeding the alternate links, and arranged in different parting planes. The matrices C are supported and guided in their movement by any suitable means but, as shown, each is provided with a plurality of guide shanks G projecting laterally therefrom and engaging bearings in the pillars B. Springs H are also shown as sleeved upon these shanks and operating to press the matrices toward each other or to close the mold. The matrices are withdrawn from each other by suitable mechanism such as the chains I secured at one end to the matrices and passing therefrom over sheaves J and connected to winding drums K. These in turn are operated by rock arms L actuated by chains M passing downward to winding drums N in the base, these being operated by levers O at the side of the base.

With the construction described, when the levers O are released the tension of the springs H will force the matrices together. Molten metal, such for instance as molten steel, is then poured in to the upper ends of the sprues, which will feed to each of the individual link mold cavities. The expansion taking place as the molten metal solidifies is provided for by the draft in the mold cavities, and by the yielding pressure of the springs H so as not to destroy the matrices. As soon as the metal has solidified, the levers O are operated to separate the matrices, permitting the cast section to be disengaged, but before again closing the matrices the end link of this section is placed in the recess P at the lower end of the series of the mold cavities, so that in the succeeding operation the cast section of chain will be united with the first cast section.

What I claim as my invention is:

1. An apparatus for molding interlooped links consisting of a base, a sectional mold arranged vertically upon said base, said mold comprising a plurality of sections meeting in a common axis and having parting faces radiating therefrom with mold cavities formed in each parting face and a pair of vertical sprues extending longitudinally of the mold for respectively feeding the alternate link molds.

2. An apparatus for molding interlooped links consisting of a base, a sectional mold arranged vertically upon said base having a plurality of parting planes transverse to each other, the mold cavities for alternate links being respectively in transverse planes and interlooped with each other, a vertical sprue extending longitudinally of the mold in each parting plane and communicating respectively with alternate mold cavities, and means for separating and closing the sections in rectilinear paths.

3. An apparatus for molding interlooped links, consisting of a base, a sectional mold arranged vertically upon said base having a plurality of parting planes transverse to each other, the mold cavities for alternate links being respectively in transverse planes and interlooped with each other, a vertical sprue extending longitudinally of said mold in each parting plane and communicating with the individual mold cavities, and means carried by said base for simultaneously separating sections of the mold in transverse planes.

4. An apparatus for molding interlooped links, comprising a vertical sectional mold having a plurality of parting planes transverse to each other, the mold cavities for alternate links being respectively in transverse planes and interlooped with each other, a vertical sprue extending longitudinally of the mold in each parting plane communicating respectively with alternate mold cavities, means for yieldably pressing said sections together, and means for separating and closing the section in rectilinear paths.

5. An apparatus for molding interlooped links, consisting of a base, a series of pillars thereupon, a sectional mold arranged vertically upon said base, a guide shank extending through one of said pillars, and means secured to said shank for separating and closing the sections in rectilinear paths.

In testimony whereof I affix my signature in presence of two witnesses.

WILLIAM C. HERRON.

Witnesses:
 CHARLES W. ADAMS,
 JENNIE MAITLAND.